(No Model.) 2 Sheets—Sheet 2.

F. F. SHANKS.
CORN PLANTER.

No. 501,449. Patented July 11, 1893.

WITNESSES
Geo. E. Frech.
Roland A. Fitzgerald.

INVENTOR
F. F. Shanks
Lehmann Pattison Hecht
att'ys

UNITED STATES PATENT OFFICE.

FRANK F. SHANKS, OF WAUKEGAN, ILLINOIS.

CORN-PLANTER.

SPECIFICATION forming part of Letters Patent No. 501,449, dated July 11, 1893.

Application filed February 10, 1893. Serial No. 461,819. (No model.)

*To all whom it may concern:*

Be it known that I, FRANK F. SHANKS, of Waukegan, in the county of Lake and State of Illinois, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in corn planters; and it consists in the novel combination and arrangement of parts which will be fully described hereinafter, and especially referred to in the claims.

This invention is designed as an improvement on the machine for which Letters Patent No. 431,288 were granted me on the 1st of July, 1890, and the object of this invention is to provide an improved means of adjusting the seed planting wheels with relation to the frame, and also to provide a more perfect seed depositing mechanism.

Figure 1:
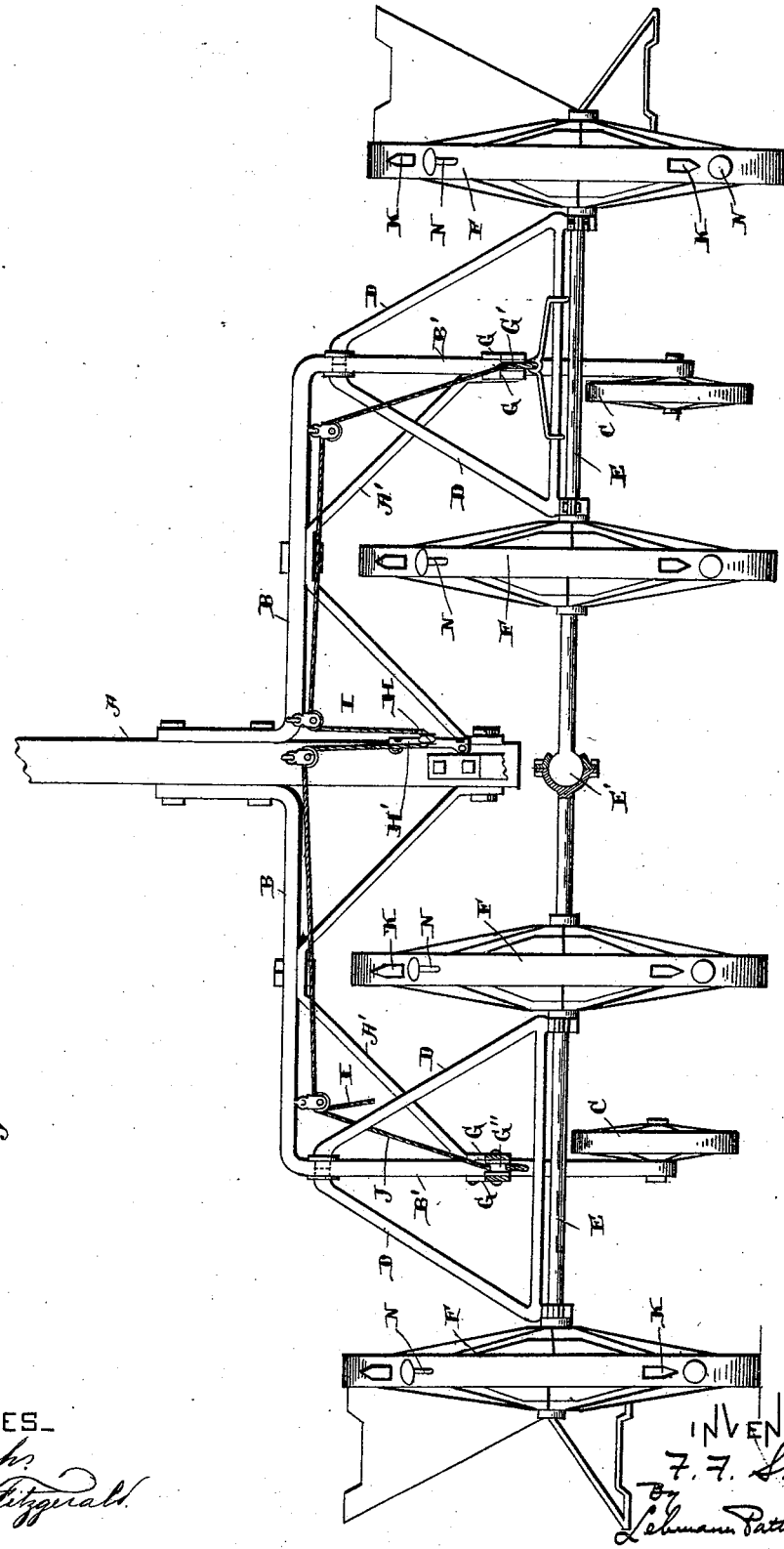
Figure 2:
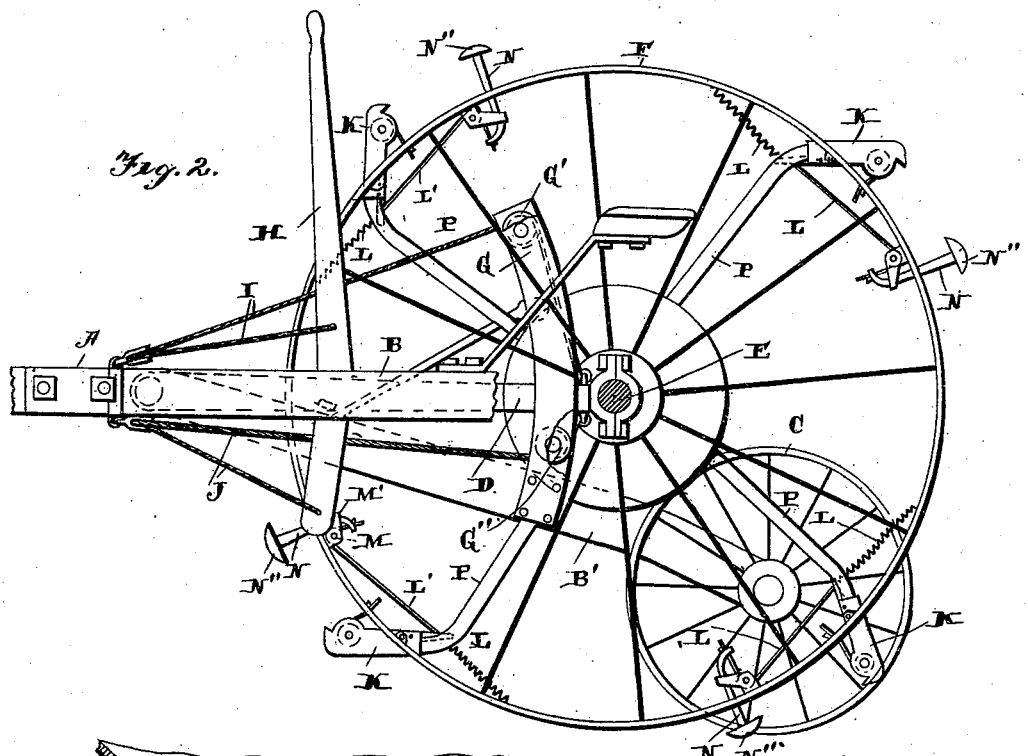
Figures 3, 4:
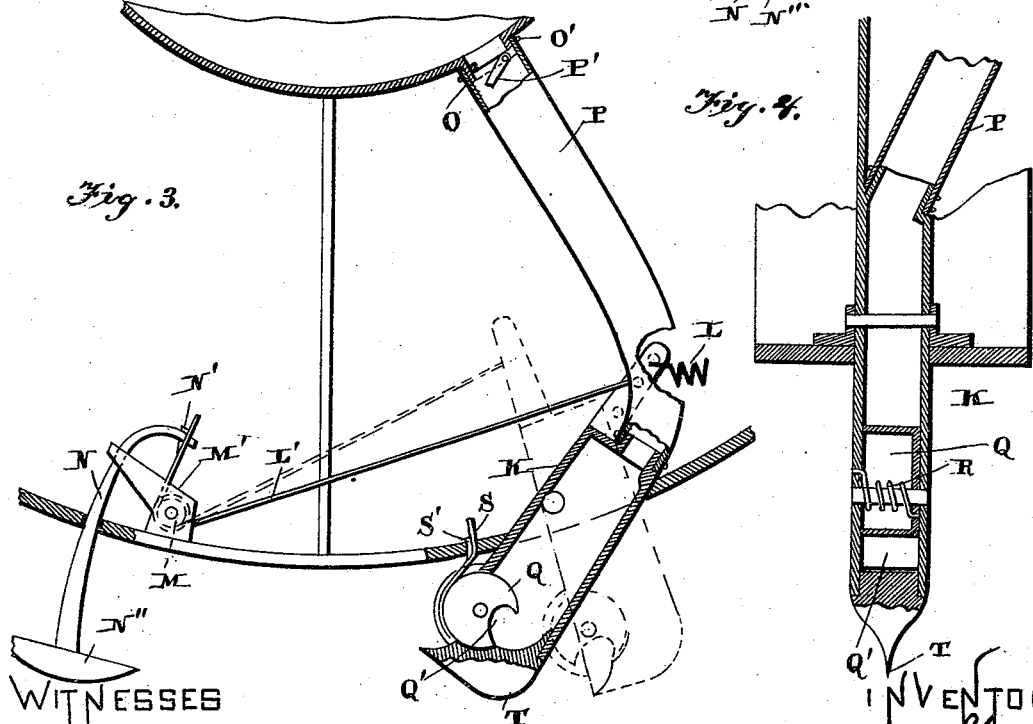

Referring to the accompanying drawings,—Figure 1 is a plan view of my improved machine. Fig. 2 is a cross sectional view of the same. Fig. 3 is an enlarged sectional elevation of a portion of one of the seed planting wheels. Fig. 4 is a vertical cross sectional view of Fig. 3.

A, designates the pole of the planter and secured thereto are the outwardly extending frame irons B, the ends of which being turned rearward as at B', and journaled to the ends of these portions B', are the machine supporting wheels C. The frame irons are strengthened in their extended positions by the braces A', arranged as shown.

Journaled to the inner ends of the arms B', are the triangular frames D, in the extended ends of which the axial shafts E, are journaled, the same being connected at their adjacent ends by the universal joint E', and upon these shafts are mounted the seed wheels F. Extending upward from between the ends of the arms B'', are the slightly curved standards G, recessed as shown and journaled in their upper ends are pulleys G', while adjacent their lower ends are the pulleys G''. Pivoted between its ends to the rear portion of pole A, is the operating lever H, having attached to it above its pivotal point the line or rope I, which extends around pulleys suitably secured to the frame on opposite sides of the same, its ends finally extending up over pulleys G', and depending therefrom they are connected to the rear portions of the angular frames D. A rope J, is correspondingly secured at its ends to the said frames but extends down around pulleys G'', at the lower ends of standards G, and from thence forward in a manner similar to the line I, until the lower end of lever H, is reached and to this the line is secured. Thus it will be seen that by a forward movement of the upper end of the operating lever H, the line J, will be drawn upon and the seed planting wheels thus forced down to the ground, while a reverse of this movement draws upon line I, and raises the said wheels out of operation. A rack H', is provided for holding the lever H, in the desired adjustment.

Each planter wheel F, carries a suitable number of depositors K, which are pivotally mounted in slots in the peripheries of the wheels F. The depositor is held normally in a backwardly drawn position by the spring L, while its projecting lower end is extended forward. Connected to the upper end of the depositor K is the forwardly extending line L', which passes around the pulley M, journaled in the block M', secured to the inner periphery of wheel F. The end of the said line is then adjustably secured to the inner end of the longitudinally movable bar N, by wedge N'. The said bar carries at its outer end the pressure foot N''. Thus it will be understood that when the wheel F, is moved forward the bar N, will be pushed inward, pulling the line L forward, and with it the depositor K into a position for dropping the seed.

The hub of wheel F, constitutes the seed box. Openings are formed at intervals in the edge thereof and surrounding the same are the annular flanges O, to which the inner ends of the radial seed tubes P, are secured by the binding wires O'. The outer ends of these tubes are secured in a similar manner to the upper ends of the seed depositors as shown. Outwardly swinging valves P' are located at the inner ends of the tubes so that when in the revolution of the wheel the tubes are turned upright the seed contained therein will not run back into the central box. These valves automatically open when the tubes are extended downward allowing the seed to run into the latter. Thus it will be understood that seed is in readiness at all times to be planted by the depositors. When the depositor is drawn forward by line L', as described above, a disk Q, having a recess Q', is partially revolved within a recess in the lower end of the depositor, turning outward the said recess in the disk which carries the seed into the ground which has run thereinto from the depositor. The axial pin of the said disk is provided with a spiral spring R, as shown in Fig. 4 so that the recess Q', is held normally turned inward. The partial rotation of the same is effected by a cord S, secured at its outer end to the periphery of said disk and at its inner end adjustably secured in a slot in the periphery of wheel F, by wedge S'. The lower end and rear edge of the depositor is sharpened as shown at T., so as to effect a ready opening of the hill for the reception of the seed.

The tubes P, are formed of rubber or other flexible material which will readily accommodate itself to the relative positions of the depositor and seed box. When the former is in a vertical position and in line with the latter it will be seen that the distance between them is much less than when the depositor is turned to either side. It is therefore essential that a permanent connecting tube should be flexible. As soon as the wheel has turned sufficiently far to release the movable bar N, the same is pushed outward and the depositor drawn backward by spring L, into position for another planting operation, while the spring R, places the disk Q, in a like position.

Having thus fully described my invention, I claim—

1. In a planter, the combination of a frame, a support for a seed planting mechanism adjustable thereon, pulleys supported by the frame above and below the normal position of said support, a lever fulcrumed between its ends to the frame, and lines leading from opposite sides of the fulcrum point of the lever over the respective pulleys and finally secured to the said support, substantially as shown and described.

2. In a planter, the combination of a frame, standards extending vertically therefrom having pulleys in their respective ends, a support for a seed planting mechanism adjustable on said frame, a lever fulcrumed between its ends to the frame and lines extending from the said lever on opposite sides of the fulcrum point over said pulleys in the ends of the standards and finally secured to the said support, substantially as shown and described.

3. In a planter, the combination of a frame, standards extending vertically therefrom having pulleys in their respective ends, a support for a seed dropping mechanism over said frame, a loose connection between the said support and the frame, a lever fulcrumed between its ends to the frame, and lines leading from opposite sides of the fulcrum point thereof rearward over the respective pulleys and finally secured to the said support, substantially as shown and described.

4. In a planter, the combination of a pole, angular frames extending from opposite sides thereof, standards extending vertically from the said frames having pulleys in their respective ends, frames D, loosely secured at their forward ends to the said first named frames, a seed dropping mechanism support secured to the rear ends of the said frames D, a lever fulcrumed between its ends to the pole, and lines leading from opposite sides of the fulcrum point therefor rearward over the respective pulleys and finally secured to the said frames D, substantially as shown and described.

5. In a planter, the combination of a frame, angular frames D, loosely secured thereto, a support for a seed dropping mechanism secured to the said frame D, and a means for adjusting vertically the said support with relation to the frame, substantially as shown and described.

6. In a planter, the combination of a wheel, a seed containing depositor secured to the periphery thereof, a revoluble disk at the lower end of the depositor for turning the seed out of the same, and a means for operating the latter, substantially as shown and described.

7. In a planter, the combination of a wheel, a seed containing depositor pivoted to the periphery of the wheel, an automatically operated means for drawing the upper end of the said depositor forward against the pull of a spring, and a revoluble recessed disk at the lower end of the depositor for turning the seed out of the same, substantially as shown and described.

8. In a planter, the combination of a wheel, a seed containing depositor fulcrumed between its ends to the wheel periphery, a means for drawing the upper end of the depositor forward against the pull of a spring, a revoluble recessed disk journaled in a recess in the lower end of the depositor and a cord connecting its periphery with the wheel, whereby when the lower end of the depositor is turned rearward the disk is revolved and its recessed side turned outward, substantially as shown and described.

9. In a planter, the combination of a wheel, a seed containing depositor fulcrumed between its ends to the wheel periphery, a means for drawing the upper end of the depositor forward against the pull of a spring, a revoluble recessed disk journaled in a recess in the lower end of the depositor, a spring encircling the axial pin of said disk for holding its recessed side normally turned inward, and a cord connecting the peripheries of the said disk and wheel, substantially as shown and described.

10. In a planter, the combination of a wheel, a seed containing depositor fulcrumed between its ends to the periphery of the wheel, an inwardly movable push bar extending inward through the wheel periphery, a line connected at one end to the inner end of the said depositor, a pulley supported by the wheel periphery around which the said line passes, a wedge for securing the opposite end of the line in an opening in the inner end of the said push bar, and a means for turning the seed out of the lower end of the depositor, when the same is drawn forward, substantially as shown and described.

11. In a planter, the combination of a wheel, a seed box carried thereby, a seed depositor secured to the periphery of the wheel, a means for turning the seed out of the same, and a flexible tube connecting the seed box and the depositor, substantially as shown and described.

12. In a planter, the combination of a wheel, a seed box carried thereby, a depositor fulcrumed to the periphery of the wheel, a means for turning the same into a planting position, and a flexible tube connecting the seed box and depositor, substantially as shown and described.

13. In a planter, the combination of a wheel, a seed box carried thereby, a seed depositor fulcrumed between its ends to the wheel periphery, a spring for holding the upper end of the same normally in a rearwardly drawn position, a means for drawing the same forward into a dropping position, and a flexible tube connecting the depositor and seed box, substantially as shown and described.

In testimony whereof I affix my signature in presence of two witnesses.

FRANK F. SHANKS.

Witnesses:
J. F. PILLIFANT,
JAMES VAN DEUSEN.